May 3, 1932. J. TEKAVEC 1,857,090

VALVE RESEATING TOOL

Filed June 12, 1929

INVENTOR.
John Tekavec
BY
Frank J. Lawler.
ATTORNEY.

Patented May 3, 1932

1,857,090

UNITED STATES PATENT OFFICE

JOHN TEKAVEC, OF CLEVELAND, OHIO, ASSIGNOR OF ONE-HALF TO L. D. FARRELL, OF CLEVELAND, OHIO

VALVE RESEATING TOOL

Application filed June 12, 1929. Serial No. 370,265.

This invention relates to improvements in valve reseating tools, an object of the invention being to provide a tool which is primarily designed to facilitate the reseating of valves, faucets and the like, with ease and despatch.

An object of this invention therefore is, to provide a tool which will be applicable to valve-casings, and the like, of a variety of sizes, either externally or internally threaded.

Another object is to provide a tool, which will be simple and practical in construction, strong and durable and efficient in use, and comparatively inexpensive to make.

The foregoing and other objects, together with their attendant advantages, will be apparent as the invention becomes better understood, by reference to the accompanying specification and drawings forming a part thereof, it being premised that changes may be made in the various details and manner of operation, within the scope of the appended claims, without departing from the spirit of the invention.

An example of my invention is illustrated in the accompanying drawings in which:—

Figures 1, 2:
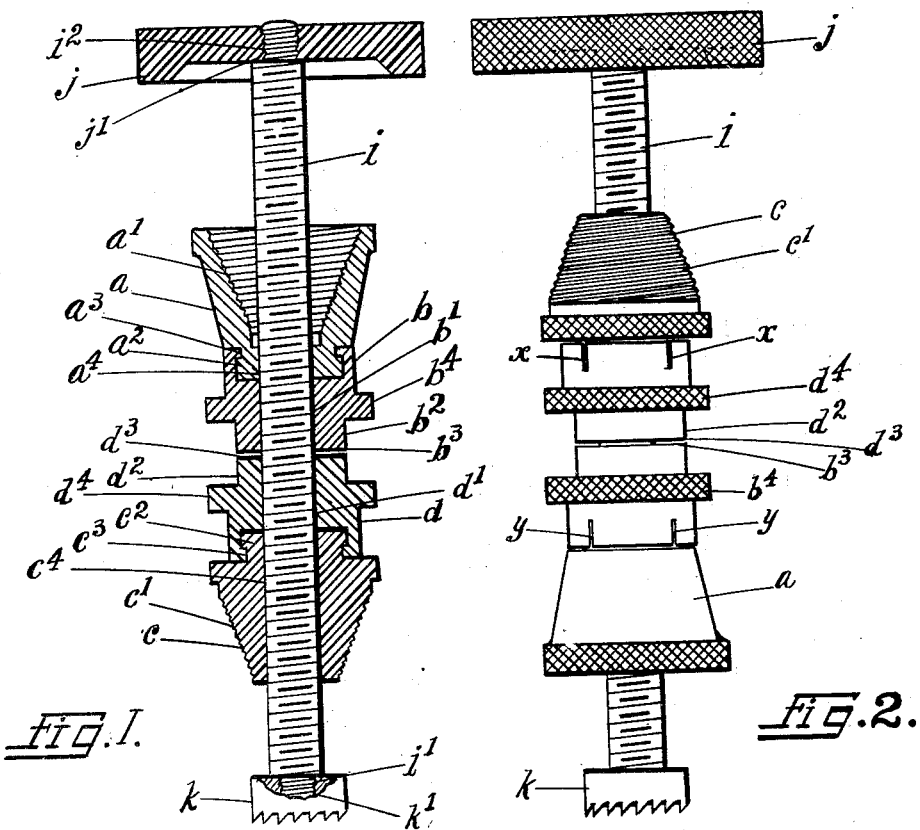
Figure 1 is a central vertical section.
Figure 2 is a side view in elevation.
Figure 3:
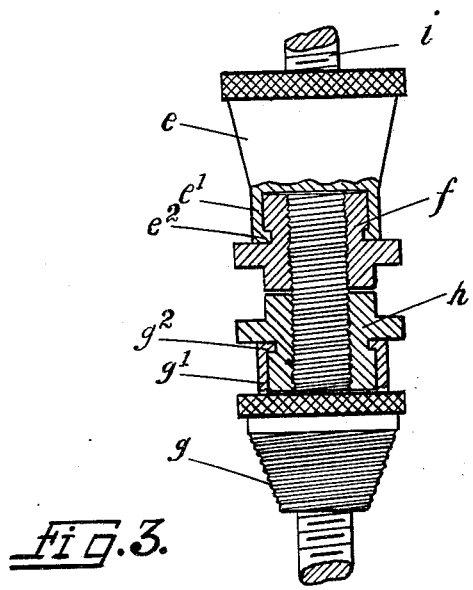
Figure 3 is a view corresponding to Fig. 1, of a slightly modified form, showing a converse arrangement of securing the caps.

In the said drawings $a$ indicates an adapting device of any suitable form internally-threaded and tapered or otherwise as at $a^1$, adapted to engage various sizes of exteriorly threaded valve casings and the like, and having formed thereon or attached thereto, or integral therewith, a hub $a^2$, having an annular groove $a^3$, and having a hole or bore $a^4$ therethrough snugly engaging the tool spindle.

$b$ is a cap member, mutually formed to rotatably fit the hub and annular groove, and having a threaded bore $b^1$ to threadedly engage the tool spindle. The cap is also formed with an integral boss $b^2$ having a friction surface $b^3$, and a knurled section $b^4$, their purposes are hereinafter described.

$c$ indicates an adapting device, of any suitable form, externally threaded and tapered or otherwise as at $c^1$, adapted to engage various sizes of interiorly threaded valve casings and the like, and having formed thereon or attached thereto or integral therewith, a hub $c^2$, having an annular groove $c^3$, and having a hole or bore $c^4$ therethrough snugly engaging the tool spindle.

$d$ is a cap member mutually formed to rotatably fit the hub and annular groove, and having a threaded bore $d^1$ to threadedly engage the tool spindle. The cap is also formed with an integral boss $d^2$ having a friction surface $d^3$, and a knurled section $d^4$, their purposes are hereinafter described.

$e$ indicates an adapting device, of any suitable form, having an annular skirt $e^1$ terminating in an internally projecting flange $e^2$, having a cap $f$ mutually formed to fit rotatably the skirt and flange, otherwise the construction is the same as that of $a$ and $b$ above described.

$g$ indicates an adapting device of any suitable form, having an annular skirt $g^1$ and terminating in an internally projecting flange $g^2$, and having a cap $h$ mutually formed to fit rotatably the skirt and flange, otherwise its construction is the same as that of $c$ and $d$ above described.

$i$ indicates a threaded tool spindle having its ends similarly reduced in diameter to form a shoulder and being threaded as at $i^1$ and $i^2$ to reversibly receive the actuating means $j$ or the cutter $k$.

$j$ indicates a detachable mounted actuating device having a threaded axial bore $j^1$ to engage the tool spindle on either end.

$k$ indicates a detachably mounted cutter having a threaded bore $k^1$ to engage the tool spindle on either end.

It is evident from the construction as shown, that the cap will not fit on or over the hub, or on or into the skirt formed on the adapting device, due to the flange formed thereon or therein. This is accomplished by splitting the cap as at $x$, $x$ and $y$, $y$, the skirt may be likewise split (not shown but understood in the art), the metal is then distended in order that the flange may be made to encompass the hub on the device, or the skirt likewise distended to encompass the annular groove on the cap; the distended portions are then forced back to place, and the cap is prevented from slipping off the hub, or out of the skirt, by the flange engaging the groove formed therein.

The operation of the mechanism described is as follows:—

The adapting device, either internally or externally threaded, is mounted on a valve casing in which reseating is necessary. The threaded tool spindle with its cutter is brought into cutting relation with the valve seat through the operation of the actuating means. The knurled portions of the caps are grasped, one in each hand. One cap is held stationary and the other is turned down on the threaded tool spindle. The contiguous ends of the bosses on the caps engage one another frictionally and act as a locking device or as lock nuts, thereby holding the tool spindle rigid in the caps, but allowing the tool spindle to rotate on the hub of the device or in the skirt, which ever method is used.

If it be found necessary to remove additional metal from the valve seat, the caps are loosened on the tool spindle, the cap held in one hand, and the tool spindle threaded slightly into the cap downwardly, the caps are again locked, both of said caps being rotationally free relative to said adapting devices, and the operation repeated, until the result desired is obtained.

While I have herein shown and described one example of my invention, it will be readily understood that changes and modifications therein may be found desirable or essential in meeting the various exigencies of use, and I desire to be understood as reserving the right to make any and all such changes or modifications as may be found desirable or essential, in so far as the same may fall within the spirit and scope of the invention as expressed in the accompanying claims when broadly construed.

Having thus described my invention, what I claim is:—

1. A valve reseating device comprising a threaded tool spindle equipped with reversibly mounted actuating means and cutter, the tool spindle also having threaded adapting devices mounted thereon, each device having an axial bored annular grooved hub; rotatably mounted bossed caps with locking surfaces and axial aligned bores, secured to each adapting device, and means in the caps to position the tool spindle.

2. A valve reseating device comprising a threaded tool spindle equipped with reversibly mounted actuating means and cutter, the tool spindle also having adapting devices mounted thereon, one of the said devices being interiorly tapered and threaded, the other being exteriorly tapered and threaded, each member having an axial bored annular grooved hub; rotatably mounted bossed caps with locking surfaces and axial aligned bores secured to each adapting device, and means in the caps to position the tool spindle.

3. A valve reseating device comprising a threaded tool spindle equipped with reversibly mounted actuating means and cutter, the tool spindle also having threaded adapting devices mounted thereon, each device having an axial bore and an annular flanged skirt, rotatably mounted bossed caps with locking surfaces and axial aligned bores, secured to each adapting device, means in the caps whereby the position of the tool spindle may be adjusted in conformity with a predetermined position, the locking surfaces adapted to arrest the downward travel of the tool spindle while allowing desired rotational movement of the caps in the skirt.

4. A valve reseating device comprising a threaded tool spindle equipped with reversibly mounted actuating means and cutter, the tool spindle also having threaded adapting devices mounted thereon, each device having an axial bored annular grooved hub; rotatably mounted caps, means on the caps for clamping said caps in frictional contact with each other, and axial aligned bores, secured to each adapting device, and means in the caps for adjusting the position of the tool spindle.

5. A valve reseating device comprising a threaded tool spindle equipped with a reversibly mounted actuating means and cutter, the tool spindle also having threaded adapting devices mounted thereon, one of the said devices being exteriorly tapered and threaded, the other being interiorly tapered and threaded, each device having associated with it a secured rotatably mounted cap, means in the caps engaging the threads on the tool spindle, and friction surface on each cap whereby on loosening the caps the tool spindle can be adjusted, and on screwing up the caps through the instrumentality of the friction surfaces the adjustment is retained.

6. A valve reseater comprising two reversible adapters, one idle and one working, a threaded tool spindle with a fixed actuating means and a detachable cutter, each adapter journalled in a cap, means for engaging either of said adapters with the tool spindle, one of the said adapters being at all times idle but cooperating with the working adapter, means for selectively engaging any one of the said adapters with the tool spindle whereby the preselected adapter cap may be made fast with the tool spindle, means controlled by the idle adapter to render the connection between the working adapter and the tool spindle inoperative while the tool is operating, and operative after the idle adapter has been loosened on the tool spindle.

In testimony whereof I affix my signature.

JOHN TEKAVEC.